(12) United States Patent
Wang et al.

(10) Patent No.: US 11,839,008 B2
(45) Date of Patent: Dec. 5, 2023

(54) SMART WINDOW AND DRIVING METHOD THEREOF, AND SMART WINDOW SYSTEM

(71) Applicants: Beijing BOE Sensor Technology Co., Ltd., Beijing (CN); BOE TECHNOLOGY GROUP CO., LTD., Beijing (CN)

(72) Inventors: Yongbo Wang, Beijing (CN); Chen Meng, Beijing (CN); Yiping Ruan, Beijing (CN); Shaobo Han, Beijing (CN); Siheng Xu, Beijing (CN); Zhong Hu, Beijing (CN); Kai Yu, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 323 days.

(21) Appl. No.: 17/242,458

(22) Filed: Apr. 28, 2021

(65) Prior Publication Data

US 2022/0086995 A1 Mar. 17, 2022

(30) Foreign Application Priority Data

Sep. 17, 2020 (CN) .......................... 202010980667.8

(51) Int. Cl.
*H05B 47/29* (2020.01)
*G02F 1/137* (2006.01)
(Continued)

(52) U.S. Cl.
CPC ............. *H05B 47/29* (2020.01); *G02F 1/137* (2013.01); *G02F 1/13338* (2013.01);
(Continued)

(58) Field of Classification Search
CPC ..... H05B 47/29; H05B 45/50; G02F 1/13338; G02F 1/137; G06F 3/0416
(Continued)

(56) References Cited

U.S. PATENT DOCUMENTS

| | | | |
|---|---|---|---|
| 2014/0118417 A1* | 5/2014 | Kang | ....................... G09G 3/34 |
| | | | 315/192 |
| 2017/0001496 A1 | 1/2017 | Wang | |
| 2020/0103705 A1* | 4/2020 | Chen | ..................... G02F 1/1368 |

FOREIGN PATENT DOCUMENTS

| | | |
|---|---|---|
| CN | 201293830 Y | 8/2009 |
| CN | 103391677 A | 11/2013 |

(Continued)

OTHER PUBLICATIONS

China Patent Office, CN202010980667.8 First Office Action dated Apr. 13, 2023.

*Primary Examiner* — Charles S Chang
(74) *Attorney, Agent, or Firm* — HOUTTEMAN LAW LLC (57) ABSTRACT

The present disclosure provides a smart window and a driving method thereof and a smart window system. The smart window includes a glass module, a first controller, at least one light bar group and a light bar monitoring circuit. The glass module is coupled to the first controller; the at least one light bar group is coupled to the first controller; and the light bar monitoring circuit includes at least one light bar monitoring sub-circuit. The at least one light bar monitoring sub-circuit is coupled to the first controller and is coupled in a one-to-one correspondence to the at least one light bar group.

18 Claims, 5 Drawing Sheets

(51) Int. Cl.
    *G02F 1/1333*    (2006.01)
    *H05B 45/50*    (2022.01)
    *G06F 3/041*    (2006.01)
    *B60J 3/04*    (2006.01)
(52) U.S. Cl.
    CPC ................ H05B 45/50 (2020.01); *B60J 3/04* (2013.01); *G06F 3/0416* (2013.01)
(58) Field of Classification Search
    USPC .......................................................... 349/16
    See application file for complete search history.

(56) References Cited

FOREIGN PATENT DOCUMENTS

| | | |
|---|---|---|
| CN | 204432324 U | 7/2015 |
| CN | 205069026 U | 3/2016 |
| CN | 205265961 U | 5/2016 |
| CN | 207257311 U | 4/2018 |
| CN | 108156722 A | 6/2018 |
| CN | 110843830 A | 2/2020 |

* cited by examiner

SMART WINDOW AND DRIVING METHOD THEREOF, AND SMART WINDOW SYSTEM

CROSS-REFERENCE TO RELATED APPLICATIONS

The present application claims the priority of the Chinese Patent Application No. 202010980667.8, filed on Sep. 17, 2020 at the Chinese Intellectual Property Office, the content of which is incorporated herein by reference in its entirety.

TECHNICAL FIELD

The present disclosure relates to the technical field of smart window, and particularly relates to a smart window and a driving method thereof, and a smart window system.

BACKGROUND

At present, a smart window has a glass module, light transmittance of which is adjustable, and a display region with display function. In the related art, a plurality of light emitting devices exit in the display region. The problems, such as abnormal display or failure of the light emitting devices, often occur in the display region.

SUMMARY

According to one aspect of the present disclosure, a smart window is provided. The smart window includes a glass module, a first controller, at least one light bar group and a light bar monitoring circuit; wherein the glass module is coupled to the first controller, and light transmittance of the glass module is controlled by the first controller; the at least one light bar group is coupled to the first controller and emits light under control of the first controller to indicate an operating state of the glass module; and the light bar monitoring circuit includes at least one light bar monitoring sub-circuit; the at least one light bar monitoring sub-circuit is coupled to the first controller and is coupled in a one-to-one correspondence to the at least one light bar group, so as to detect the operating state of the light bar group coupled to the at least one light bar monitoring sub-circuit and feed the operating state back to the first controller.

In some embodiments, the smart window further includes at least one light bar driving circuit which is coupled to the first controller and is coupled in a one-to-one correspondence to the at least one light bar group, wherein each of the at least one light bar group includes a display light bar and at least one backup light bar, and both the display light bar and the at least one backup light bar in each of the at least one light bar group are coupled to a corresponding light bar driving circuit; and the first controller receives the operating state of the display light bar sent by the at least one light bar monitoring sub-circuit, and controls the corresponding light bar driving circuit to stop driving the display light bar and to drive one of the at least one backup light bar when the operating state of the display light bar is abnormal.

In some embodiments, each of the at least one light bar monitoring sub-circuit includes: a sampling resistor, wherein a first end of the sampling resistor is coupled to a first end of the display light bar and a first end of the at least one backup light bar in a corresponding light bar group, and a second end of the sampling resistor is coupled to a reference power supply; and a plurality of state acquiring circuits, wherein the plurality of state acquiring circuits are coupled in a one-to-one correspondence to the display light bar and the at least one backup light bar in the corresponding light bar group, and the plurality of state acquiring circuits are coupled to the first end of the sampling resistor, a second end of the display light bar or a second end of the at least one backup light bar in the corresponding light bar group, and the first controller.

In some embodiments, the smart window further includes a memory coupled to the first controller, wherein the memory is configured to store voltages at the first and second ends of the display light bar acquired by the plurality of state acquiring circuits, a resistance value of the sampling resistor, and a current of the display light bar and voltages at the first and second ends of the display light bar during normal operation of the display light bar.

In some embodiments, the smart window further includes a light bar driving board on which the light bar monitoring circuit, the at least one light bar driving circuit and the first controller are integrated.

In some embodiments, the smart window includes a light adjusting region and a display region on at least one side of the light adjusting region, wherein the glass module is located in the light adjusting region and the at least one light bar group is located in the display region.

In some embodiments, the smart window further includes a touch panel coupled to the glass module and configured to adjust the light transmittance of the glass module by touch control.

In some embodiments, the touch panel includes a surface touch control assembly and a surface touch control driving board, the surface touch control assembly is stacked with the glass module, the surface touch control driving board is coupled to the surface touch control assembly and the glass module, wherein the surface touch control driving board includes a surface touch control output circuit and a second controller, the surface touch control output circuit receives a first touch control signal input by the surface touch control assembly and transmits the first touch control signal to the second controller, and the second controller adjusts the light transmittance of the glass module according to the first touch control signal.

In some embodiments, the touch panel further includes a touch control key assembly and a touch control key driving board, the touch control key driving board is coupled to the touch control key assembly and the glass module, and the touch control key assembly is located in the display region of the smart window, wherein the touch control key driving board includes a touch control key output circuit and a third controller, the touch control key output circuit receives a second touch control signal input by the touch control key assembly and transmits the second touch control signal to the third controller, and the third controller adjusts the light transmittance of the glass module according to the second touch control signal.

In some embodiments, the touch panel includes a touch control key assembly and a touch control key driving board, the touch control key driving board is coupled to the touch control key assembly and the glass module, the touch control key assembly is located in the display region of the smart window, wherein the touch control key driving board includes a touch control key output circuit and a third controller, the touch control key output circuit receives a second touch control signal input by the touch control key assembly and transmits the second touch control signal to the third controller, and the third controller adjusts the light transmittance of the glass module according to the second touch control signal.

In some embodiments, the touch panel further includes a surface touch control assembly stacked with the glass module, the smart window further includes a first integrated driving board on which the light bar monitoring circuit, the at least one light bar driving circuit and the first controller are integrated; the first integrated driving board is further provided with a surface touch control output circuit, and the surface touch control output circuit is coupled to the surface touch control assembly and the first controller via a connecting structure on the first integrated driving board, and is configured to receive a first touch control signal input by the surface touch control assembly and to transmit the first touch control signal to the first controller; the first controller adjusts the light transmittance of the glass module according to the first touch control signal.

In some embodiments, the touch panel includes a touch control key assembly in the display region of the smart window, the smart window further includes a second integrated driving board on which the light bar monitoring circuit, the at least one light bar driving circuit and the first controller are integrated; and the second integrated driving board is further provided with a touch control key output circuit, the touch key output circuit is coupled to the touch control key assembly and the first controller via a connecting structure on the second integrated driving board, the touch control key output circuit receives a second touch control signal input by the touch control key assembly and transmits the second touch control signal to the first controller, and the first controller adjusts the light transmittance of the glass module according to the second touch control signal.

In some embodiments, the touch panel includes a surface touch control assembly and a touch control key assembly, the surface touch control assembly is stacked with the glass module, and the touch control key assembly is located in the display region, the smart window further includes a third integrated driving board on which the light bar monitoring circuit, the at least one light bar driving circuit and the first controller are integrated; the third integrated driving board is further provided with a surface touch control output circuit and a touch control key output circuit; and the surface touch control output circuit is coupled to the surface touch control assembly and the first controller via a connecting structure on the third integrated driving board, and is configured to receive a first touch control signal input by the surface touch control assembly and to transmit the first touch control signal to the first controller; the touch control key output circuit is coupled to the touch control key assembly and the first controller via the connecting structure on the third integrated driving board, and is configured to receive a second touch control signal input by the touch control key assembly and to transmit the second touch control signal to the first controller; the first controller adjusts the light transmittance of the glass module according to the first touch control signal or the second touch control signal.

In some embodiments, the smart window further includes a main control board, wherein the main control board is coupled to the glass module and is coupled to the first controller via the connection structure on the third integrated driving board, and the main control board is configured to control display of the at least one light bar group according to the operating state of the at least one light bar group fed back by the first controller, and to generate voltages according to the first touch control signal or the second touch control signal fed back by the first controller to adjust the light transmittance of the glass module.

In some embodiments, each of the display light bar and the at least one backup light bar includes a plurality of light emitting devices connected in series.

According to one aspect of this disclosure, the plurality of light emitting devices includes sub-millimeter light emitting diodes.

According to one aspect of this disclosure, a smart window system including the above smart window and a driving circuit for driving the smart window is provided.

According to one aspect of this disclosure, a method for driving a smart window is provided. The smart window includes a glass module, a first controller, at least one light bar group and a light bar monitoring circuit; wherein the glass module is coupled to the first controller, and light transmittance of the glass module is controlled by the first controller; the at least one light bar group is coupled to the first controller and emits light under control of the first controller to indicate an operating state of the glass module; and the light bar monitoring circuit includes at least one light bar monitoring sub-circuit; the at least one light bar monitoring sub-circuit is coupled to the first controller and is coupled in a one-to-one correspondence to the at least one light bar group, so as to detect the operating state of the light bar group coupled to the at least one light bar monitoring sub-circuit and feed the operating state back to the first controller, the method including the following steps: acquiring, by the light bar monitoring circuit, an operating voltage and an operating current of the at least one light bar group; and judging, by the light bar monitoring circuit, whether the at least one light bar group is abnormal according to the operating voltage and the operating current.

In some embodiments, the smart window further includes at least one light bar driving circuit coupled to the first controller and coupled in a one-to-one correspondence to the at least one light bar group, and each of the at least one light bar group includes a display light bar and at least one backup light bar, and both the display light bar and the at least one backup light bar in each of the at least one light bar group are coupled to a corresponding light bar driving circuit, the method further includes the following steps: in responsive to the first controller determining that the display light bar which displays is abnormal, controlling a corresponding light bar driving circuit to stop driving the display light bar and to drive one of the at least one backup light bar.

In some embodiments, the smart window further includes a touch panel including a surface touch control assembly, a surface touch control output circuit coupled to the surface touch control assembly and the first controller, a touch control key assembly, and a touch control key output circuit coupled to the touch control key assembly and the first controller, and the method further includes: determining whether the first controller receives a touch control interrupt signal; in responsive to the touch control interrupt signal being received, determining, by the first controller, whether the touch control interrupt signal is a first touch control signal which is generated by touching the surface touch control assembly and output by the surface touch control output circuit; and in responsive to the touch control interrupt signal being the first touch control signal output by the surface touch control output circuit, performing light adjusting of the glass module according to the first touch control signal; in responsive to the touch control interrupt signal being a second touch control signal which is generated by touching the touch control key assembly and output by the touch control key output circuit, performing the light adjusting of the glass module according to the second touch signal, and the method further includes: in a case where the surface touch control output circuit does not output the first touch control signal when the surface touch control assembly is touched, prompting to perform the light adjusting of the glass module by the touch control key assembly.

DETAILED DESCRIPTION

In order to make a person skilled in the art better understand the technical solutions of the present disclosure, the following detailed description is given with reference to the accompanying drawings and the specific embodiments.

The shapes and sizes of the components in the drawings are not to scale, but are merely intended to facilitate understanding of the contents of the embodiments of the present disclosure.

Unless otherwise defined, technical or scientific terms used herein shall have the ordinary meaning as understood by a person skilled in the art to which the present disclosure belongs. A term such as "first", "second", and the like used in the present disclosure is not intended to indicate any order, quantity, or importance, but rather is used for distinguishing between different elements. Similarly, "one", "a", "the", or any other similar word does not mean a quantity limit, but means that there is at least one. The word "comprise", "include", or the like, means that the element or item preceding the word contains the element or item listed after the word and its equivalents, but does not exclude the presence of any other element or item. The terms "connect", "couple" and the like are not limited to physical or mechanical connections, but may include electrical connections and the like, whether directly or indirectly. The terms such as "upper", "lower", "left", "right", and the like are used merely for indicating relative positional relationships, and when an absolute position of the object described is changed, the relative positional relationships may also be changed accordingly.

It should be noted that any one of a first controller, a second controller, and a third controller mentioned below may be a control chip, such as a Micro Controller Unit (MCU), a Central Processing Unit (CPU).

Figure 1:
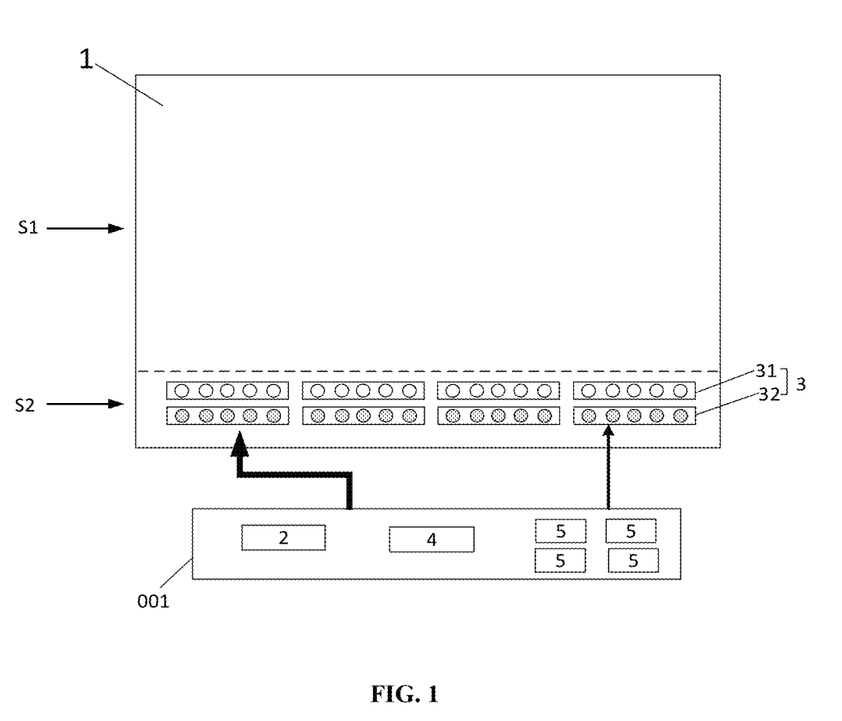
FIG. 1 is a schematic diagram illustrating a structure of a smart window according to an embodiment of the present disclosure.

According to a first aspect of the present disclosure, a smart window is provided and may be applied in a window system, such as an automobile, a train, an airplane, or the like. As shown in FIG. 1, the smart window includes a light adjusting region S1 and a display region S2 on at least one side of the light adjusting region S1, that is, the light adjusting region S1 may be surrounded by the display region S2. The display region S2 may be used to display information such as a light adjusting state (e.g., light transmittance), a current location, weather, temperature, a virtual key (e.g., a touch control key), and the like, which is not limited herein. In the embodiment, the display region S2 which is provided below the light adjusting region S1 is taken as an example. The smart window provided in the embodiment includes a glass module 1, a first controller 2, at least one light bar group 3 and a light bar monitoring circuit 4.

Specifically, the glass module 1 is provided in the light adjusting region S1. The glass module 1 is coupled to the first controller 2. The first controller 2 sends a light adjusting instruction to the glass module 1. The light transmittance of the glass module 1 is adjusted according to the light adjusting instruction, so that the glass module 1 may be in any state from a transparent state to an opaque state. A dye liquid crystal smart glass is taken as an example of the glass module 1. The glass module 1 may include two substrates including an upper substrate and a lower substrate opposite to each other. A first electrode is provided on a side of the upper substrate proximal to the lower substrate, and a second electrode is provided on a side of the lower substrate proximal to the upper substrate. A dye liquid crystal layer is provided between the first electrode and the second electrode. Voltages are applied to the first electrode and the second electrode, and an electric field is generated between the first electrode and the second electrode. The electric field may drive liquid crystal molecules in the dye liquid crystal layer to deflect, so that the light transmittance of the liquid crystal molecules is changed, and a vehicle window with the adjustable light transmittance is achieved. Of course, the glass module 1 may have other structures, which is not limited herein.

Figure 2:
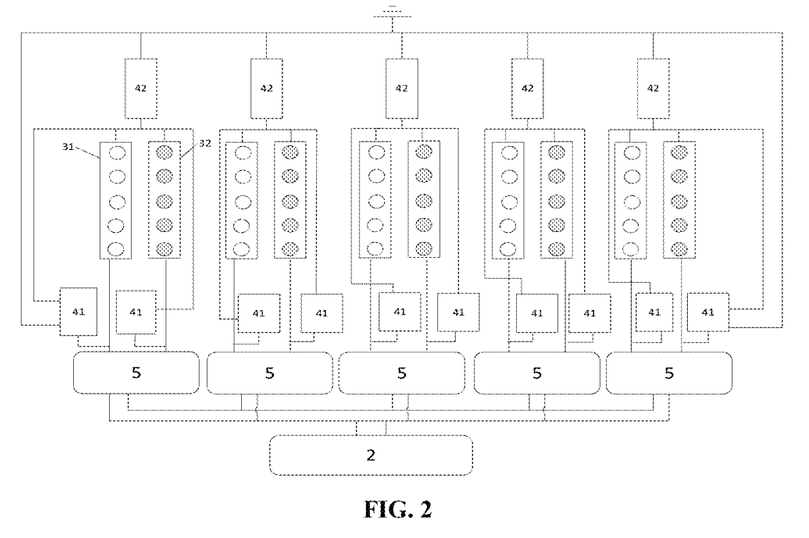
FIG. 2 is a schematic diagram illustrating how to connect a light bar monitoring circuit of a smart window according to an embodiment of the present disclosure.

Further, the at least one light bar group 3 is provided in the display region S2, that is, the light bar group 3 as a light emitting device is provided in the display region S2 for displaying preset information. Each of the at least one light bar group 3 is coupled to the first controller 2, and emits light of a corresponding gray scale under the control of the first controller 2. Referring to FIG. 2, the light bar monitoring circuit 4 includes a plurality of light bar monitoring sub-circuits (41), and the at least one light bar group 3 includes a plurality of light bar groups. The plurality of light bar monitoring sub-circuits are coupled to the first controller 2, and the plurality of light bar monitoring sub-circuits are coupled in a one-to-one correspondence to the plurality of light bar groups 3, i.e., one light bar group 3 is monitored by one light bar monitoring sub-circuit. The light bar monitoring sub-circuit is configured to monitor operating state of the light bar group corresponding to the light bar monitoring sub-circuit, and to feed the monitored operating state back to the first controller 2. The first controller 2 may determine whether the light bar in the light bar group 3 is abnormal according to the operating state of the light bar group 3. If the light bar in the light bar group 3 displays abnormally or fails, the first controller 2 may cut off the power to the abnormal light bar and supply power to the backup light bar, so that the operating state of the light bar group 3 may be monitored in real time, the display quality of the display region S2 is guaranteed, and the service life of the smart window is prolonged.

Optionally, continuing to refer to FIG. 1, the smart window provided in the embodiment further includes at least one light bar driving circuit 5. The at least one light bar driving circuit 5 may include a plurality of light bar driving circuits 5. The plurality of light bar driving circuits 5 are respectively between the first controller 2 and the plurality of light bar groups 3, and the plurality of light bar driving circuits 5 are coupled in a one-to-one correspondence to the plurality of light bar groups 3 to output driving voltages to the corresponding light bar groups 3 under the control of the first controller 2. That is, one light bar driving circuit 5 is coupled to each of the light bars in the corresponding light bar group 3. The light bar driving circuit 5 receives light information (including the information on the light bar to be driven and the information on the brightness of the light bar) sent by the first controller 2, and sends a driving voltage to drive the light bar in the light bar group 3 according to the light information. FIG. 1 shows that the smart window includes four light bar groups 3 and four light bar driving circuits 5, which are taken as an example for the present disclosure. Specifically, each of the light bar groups 3 includes a display light bar 31 and at least one backup light bar 32. Both the display light bar 31 and the backup light bar 32 are coupled to the light bar driving circuit 5 corresponding to the light bar group to which the display light bar 31 and the backup light bar 32 belong. During displaying, the light bar driving circuit 5 is made to be connected to the display light bar 31 and not to be connected to the backup light bar 32, that is, the light bar driving circuit 5 provides the driving voltage to the display light bar 31 but does not provide the driving voltage to the backup light bar 32. The plurality of light bar monitoring sub-circuits in the light bar monitoring circuit 4 monitor the operating state of the display light bars 31 in the plurality of light bar groups 3 respectively, and feed the operating state back to the first controller 2. If the light bar monitoring circuit 4 monitors that the display light bar 31 is abnormal, the first controller 2 controls the light bar driving circuit 5 to stop driving the display light bar 31, and selects one of the backup light bars 32 to be driven by the light bar driving circuit 5, so as to increase the fault tolerance of the light bar group 3. In the embodiment, the light bar group 3 including one display light bar 31 and one backup light bar 32 is taken as an example.

It should be noted that, for example, FIG. 1 shows that the first controller 2, the light bar monitoring circuit 4, and the light bar driving circuit 5 are integrated on a light bar driving board 001. It can be known that, the light bar monitoring circuit 4 and the light bar driving circuit 5 are coupled to the first controller 2 via a connection structure (for example, wirings) on the light bar driving board 001, which is not shown in FIG. 1. Moreover, pins of the light bar monitoring circuits 4 are coupled to corresponding interfaces on the upper side of the light bar driving board 001, and pins of the light bar driving circuits 5 are also coupled to corresponding interfaces on the upper side of the light bar driving board 001, so that the plurality of light bar groups 3 may be coupled to the light bar driving circuits 5 or the light bar monitoring circuits 4 by coupling to the interfaces on the upper side of the light bar driving board 001 corresponding to the light bar driving circuits 5 or the light bar monitoring circuits 4. The light bar driving board 001 will be described in detail later.

Optionally, each of the light bar groups 3 includes one display light bar 31 and at least one backup light bar 32. Each of the display light bar 31 and/or the backup light bar 32 includes a plurality of light emitting devices connected in series. The light emitting devices may be of various types, for example, the light emitting devices may be Mini light emitting diodes (Mini LED) or general light emitting diodes, and the like, which is not limited herein. Mini LEDs are also called sub-millimeter LEDs, and have a size of 50 μm to 200 μm.

Figure 3:
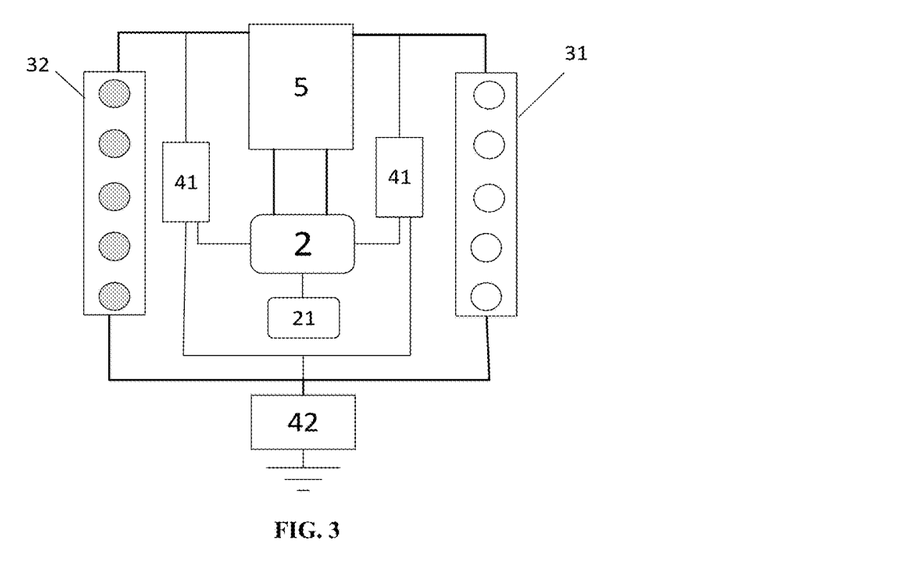
FIG. 3 is a schematic diagram illustrating a structure of a light bar monitoring sub-circuit of a smart window according to an embodiment of the present disclosure.

Further, referring to FIG. 2 and FIG. 3, the smart window provided in the embodiment includes a light bar monitoring circuit 4. The light bar monitoring circuit 4 includes a plurality of light bar monitoring sub-circuits, and each of the plurality of light bar monitoring sub-circuit monitors one light bar group 3. Referring to FIG. 3, FIG. 3 shows the connection between a single light bar monitoring sub-circuit, one light bar group 3, the light bar driving circuit 5 corresponding to the light bar group 3, and the first controller 2. Each of the plurality of light bar monitoring sub-circuits may include a plurality of state acquiring circuits 41 and a sampling resistor 42.

Specifically, a first end of the sampling resistor 42 is coupled to a first end of the display light bar 31 and a first end of the backup light bar 32 in the light bar group 3 corresponding to the light bar monitoring sub-circuit to which the sampling resistor 42 belongs, that is, the first end of each (the display light bar 31 or the backup light bar 32) of the light bars in the light bar group 3 is coupled to the sampling resistor. The sampling resistor 42 is coupled in series to the corresponding light bar. A second end of the sampling resistor 42 is coupled to a reference power source (i.e., is grounded). The current flowing through the sampling resistor 42 has a same variation trend as the current flowing through the corresponding light bar (the display light bar 31 or the backup light bar 32). Therefore, by monitoring the voltage across the sampling resistor 42 and combing the resistance value of the sampling resistor 42, the current flowing through the monitored light bar (the display light bar 31 or the backup light bar 32) in the light bar group 3 coupled in series to the sampling resistor may be obtained. The plurality of state acquiring circuits 41 are coupled in a one-to-one correspondence to the display light bar 31 and the backup light bars in the light bar group 3 corresponding to the light bar monitoring sub-circuit to which the plurality of state acquiring circuits 41 belong, that is, the display light bar 31 in each of the light bar groups 3 is coupled to one state acquiring circuit 41, and one of the backup light bars 32 in each of the light bar groups 3 is coupled to one state acquiring circuit 41, respectively. In addition, each of the state acquiring circuits 41 is between the first controller 2 and the display light bar 31 corresponding to the state acquiring circuit 41 or between the first controller 2 and the backup light bar 32 corresponding to the state acquiring circuit 41, and couples the first controller 2 to the display light bar 31 or to the backup light bar 32. The state acquiring circuit 41 may be any circuit for acquiring a voltage or a current in the related art, and the present disclosure does not limit the specific structure thereof.

Specifically, the state acquiring circuit 41 is coupled to the first end of the sampling resistor 42 corresponding to the state acquiring circuit 41, so as to acquire the voltage at the first end of the sampling resistor 42 in real time and feed the voltage back to the first controller 2. The state acquiring circuit 41 is further coupled to the second end of the sampling resistor 42, so as to acquire the voltage of the reference power source coupled to the second end of the sampling resistor 42. If the state acquiring circuit 41 acquires the voltage across the display light bar 31, the state acquiring circuit 41 needs to be further coupled to a second end of the display light bar 31. If the state acquiring circuit 41 acquires the voltage across the backup light bar 32, the state acquiring circuit 41 needs to be further coupled to a second end of the corresponding backup light bar 32. In this case, the voltage at the second end of the display light bar 31 or the backup light bar 32 in real time may be monitored, and is fed back to the first controller 2. That is, the light bar monitoring sub-circuit acquires the operating state of the display light bars 31 or the backup light bars 32 in the light bar group 3. The information on the operating state includes the voltages at the first and second ends of the sampling resistor 42, and the voltage at the second end of the display light bar 31 or the backup light bar 32. In this case, the first controller 2 obtains the current flowing through the display light bar 31 or the backup light bar 32 according to the voltages at the two ends of the sampling resistor 42 and the resistance value of the sampling resistor 42, and compares the obtained current with a preset current. If the difference between the obtained current and the preset current is too large, the operating current abnormality of the display light bar 31 or the backup light bar 32 to be monitored is recorded. Meanwhile, the first controller 2 compares the difference between the voltage at the second end of the display light bar 31 or the backup light bar 32 and a preset voltage value, and if the difference is too large, the operating voltage abnormality of the display light bar 31 or the backup light bar 32 to be monitored is recorded. The operating current and the operating voltage are synthesized to judge whether the monitored display light bar 31 or backup light bar 32 is abnormal or not. If the display light bar 31 or the backup light bar 32 is abnormal, other backup light bars 32 are then used for displaying. Certainly, the circuit structure of the light bar monitoring sub-circuit in the light bar monitoring circuit 4 may also be in other forms, which is not limited herein.

Specifically, for example, a rated voltage of each of the light bars in the light bar group 3 is 2.8V, and a rated current of each of the light bars in the light bar group 3 is 5 mA. If each of one display light bar and one backup light bar 32 constitutes of 5 light bars (i.e., both the display light bar 31 and the backup light bar 32 include 5 light bars), the total rated voltage of the 5 light bars is 14V, and the total rated current of the 5 light bars is 5 mA. When any one of the 5 light bars fails, for example, if a short circuit occurs, the acquired voltage across the 5 light bars should be lower than 14V; and if an open circuit occurs, the acquired current flowing through the 5 light bars should be 0 mA. Therefore, whether the display light bar 31 is normal may be determined by acquiring the voltage across the display light bar 31 and the current flowing through the display light bar 31.

It should be noted that, as shown in FIG. 3, the connection point between the display light bar 31, the backup light bar 32 and the sampling resistor 42 is taken as the first end of each of the display light bar 31, the backup light bar 32 and the sampling resistor 42, and the other end of each of the display light bar 31, the backup light bar 32 and the sampling resistor 42 is taken as a respective second end.

Optionally, referring to FIG. 3, the smart window provided in the embodiment further includes a first memory 21 coupled to the first controller 2 for storing the information received by the first controller 2. The information includes, such as information on activation state (i.e., whether the display light bar 31 or the backup light bar 32 is activated), information on brightness of the display light bar 31 or the backup light bar 32 in each of light bar groups 3, so that if the smart window is restarted, the information in the first memory 21 may be directly called for quick driving. In addition, the first memory 21 further stores the voltages at the first and second ends of the currently displaying display light bar acquired by the plurality of state acquiring circuits 41, the resistance value of the sampling resistor 42, the current and the voltages at the first and second ends of the display light bar 31 during normal operation, for determining the operating state of the display light bar 31 by the first controller 2.

Optionally, referring to FIG. 1, the smart window provided in the embodiment may further include a light bar driving board 001 on which the light bar monitoring circuit 4, the light bar driving circuit 5, and the first controller 2 are integrated. The light bar monitoring circuit 4 and the light bar driving circuit 5 are coupled to the first controller 2 via a connection structure on the light bar driving board 001, so that external wirings are reduced. Moreover, pins of the light bar monitoring circuit 4 are coupled to the interfaces on the upper side of the light bar driving board 001, and pins of the light bar driving circuit 5 are also coupled to the interfaces on the upper side of the light bar driving board 001, so that the plurality of light bar groups 3 may be coupled to the light bar driving circuits 5 or the light bar monitoring circuits 4 by coupling to the interfaces on the upper side of the light bar driving board 001 corresponding to the light bar driving circuits 5 or the light bar monitoring circuits 4, and therefore, the external wirings may be further reduced.

Optionally, the smart window further includes a touch panel, which is coupled to the glass module 1 and configured to adjust the light transmittance of the glass module 1 by touch control.

Figure 4:
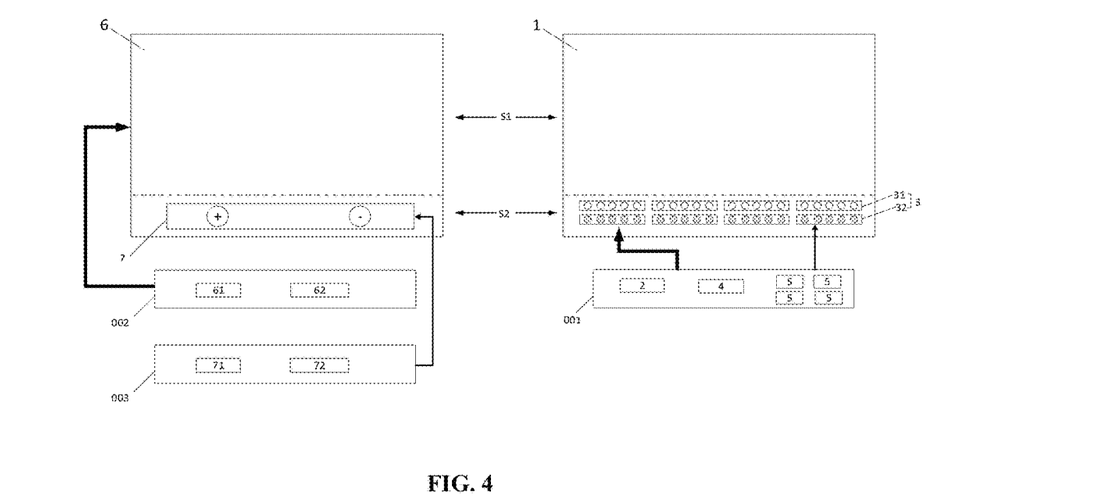
FIG. 4 is a schematic diagram illustrating a structure of a smart window (including three driving boards) according to an embodiment of the present disclosure.

As shown in FIG. 4, the touch panel may include a surface touch control assembly 6, i.e., the touch panel may be a surface touch control screen, and a touch control signal corresponding to an arbitrary touched position may be output. The surface touch control assembly 6 and the glass module 1 are stacked to each other, namely the surface touch control assembly 6 may be in the light adjusting region where the glass module 1 is located, and therefore the glass module 1 with the touch control light adjusting function may be achieved. The smart window further includes a surface touch control driving board 002 which is coupled to the surface touch control assembly 6 and the glass module 1. The surface touch control driving board 002 is provided with a second controller 61 and a surface touch control output circuit 62, and the surface touch control output circuit 62 is coupled to the second controller 61 via a connection structure on the surface touch control driving board 002, so that external wirings are reduced. Moreover, pins of the surface touch control output circuit 62 are coupled to the interfaces on the surface touch control driving board 002, so that the surface touch control assembly 6 is coupled to the surface touch control output circuit 62 by coupling to the interface on the surface touch control driving board 002. When a user touches the surface touch control assembly 6, the electrode at the touched position of the surface touch control assembly 6 outputs a first touch control signal to the surface touch control output circuit 62 on the surface touch control driving board 002. The surface touch control driving circuit 62 receives the first touch control signal and transmits the first touch control signal to the second controller 61. The second controller 61 outputs an adjusting voltage according to the first touch control signal to adjust the light transmittance of the glass module 1, thereby achieving the adjusting of the light transmittance of the glass module 1 by touch control.

Optionally, the surface touch control assembly 6 may be a mutual capacitive touch control assembly, or may alternatively be a self-capacitive touch control assembly, which is not limited herein.

Optionally, continuing to refer to FIG. 4, in order to compensate for the failure of the surface touch control assembly 6, the smart window provided in the embodiment may further include a touch control key assembly 7. The touch control key assembly 7 is in the display region S2, and may output corresponding touch control signal by touching corresponding key. The light bar group 3 in the display region S2 may be used to display a key interface of the touch control key assembly 7. For example, the touch control key assembly 7 may include two touch control keys, one key for increasing light transmittance (+) and the other key for decreasing light transmittance (−), and the light bar groups 3 in the display region S2 may display a "+" key and a "−" key. The smart window may also include a touch control key driving board 003 which is coupled to the touch control key assembly 7 and the glass module 1. Specifically, the touch control key driving board 003 is provided with a third controller 71 and a touch control key output circuit 72. The touch control key output circuit 72 is coupled to the third controller 71 via a connection structure on the surface of the touch control key driving board 003, so that external wirings are reduced. Moreover, pins of the touch control key output circuit 72 are coupled to the interfaces on the touch control key driving board 003, so that the touch control key assembly 7 is coupled to the touch control key output circuit 72 by coupling to the interfaces of the touch control key driving board 003. If a user touches the touch control key assembly 7, the touch control key assembly 7 outputs a second touch control signal to the touch control key output circuit 72 on the touch control key driving board 003. The touch control key output circuit 72 receives the second touch control signal and transmits the second touch control signal to the second controller 71. The second controller 71 generates an adjusting voltage according to the second touch control signal to adjust the light transmittance of the glass module 1, so that the light transmittance of the glass module 1 may be adjusted by the touch control key.

The smart window may be provided with the surface touch control assembly 6 and the touch control key assembly 7 independently, and the smart window may be provided with both the surface touch control assembly 6 and the touch control key assembly 7, so that the light transmittance of the glass module 1 may be adjusted by touch control even though one of the surface touch control assembly 6 and the touch control key assembly 7 fails to work, and the touch control reliability of the smart window is improved.

Further, in order to further reduce the number of wirings and reduce the space occupied by the circuits, the related circuits of the surface touch control assembly 6 and the related circuits of the light bar group 3 may be integrated on one driving board. Specifically, the smart window may include a first integrated driving board on which the light bar monitoring circuit 4, the light bar driving circuits 5, and the first controller 2 are integrated, and the surface touch control output circuit is also integrated on the first integrated driving board. The surface touch control output circuit, the light bar monitoring circuit 4 and the light bar driving circuit 5 share a same controller. The surface touch control output circuit is coupled to the surface touch control assembly and the first controller via a connecting structure on the first integrated driving board, and is used for receiving a first touch control signal input by the surface touch control assembly and transmitting the first touch control signal to the first controller. The first controller adjusts the light transmittance of the glass module 1 according to the first touch control signal.

Similarly, in order to further reduce the number of wirings and reduce the space occupied by the circuits, the related circuits of the touch control key assembly 7 and the related circuits of the light bar group 3 may be integrated on one driving board. The following description will take an example in which the related circuits of the touch control key assembly 7 and the related circuits of the light bar group 3 are integrated on one driving board.

Figure 5:
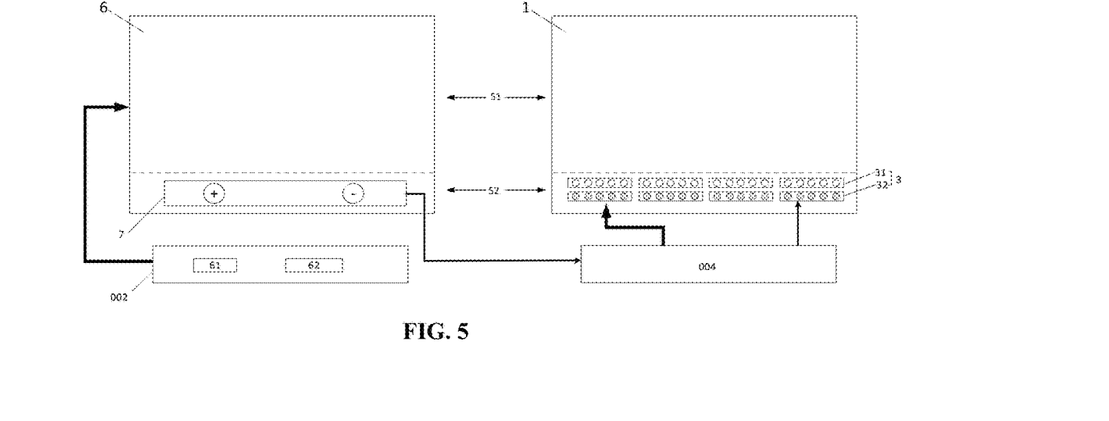
FIG. 5 is a schematic diagram illustrating a structure of a smart window (including two driving boards) according to an embodiment of the present disclosure.
Figures 6, 7:
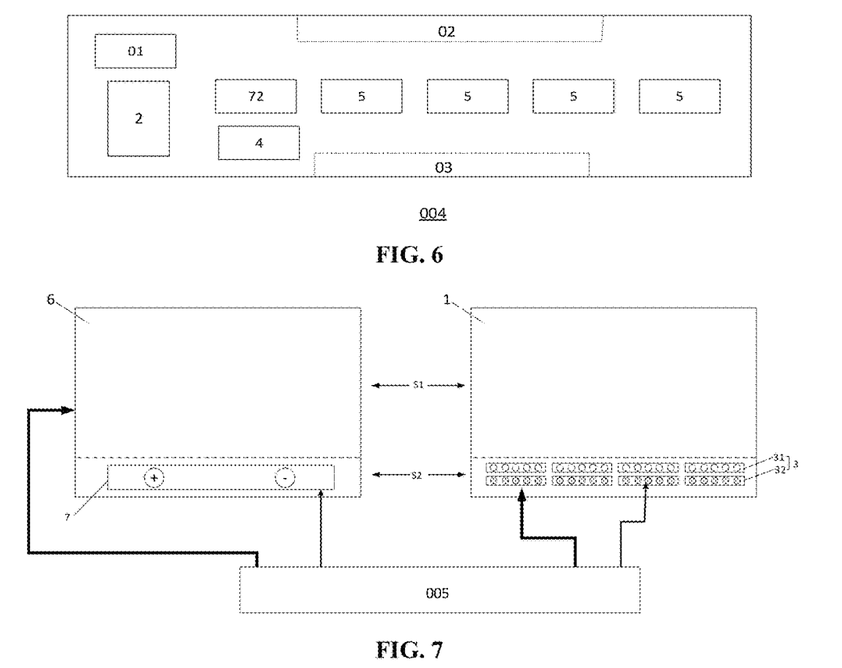
FIG. 6 is a schematic diagram illustrating a structure of a second integrated driving board in the embodiment of FIG. 5.
FIG. 7 is a schematic diagram illustrating a structure of a smart window (including a driving board) according to an embodiment of the present disclosure.

Referring to FIG. 5 and FIG. 6, the smart window may include a second integrated driving board 004 on which the light bar monitoring circuit 4, the light bar driving circuits 5, and the first controller 2 are integrated, and the touch control key output circuit 72 is also integrated on the second integrated driving board 004. The touch control key output circuit 72, the light bar monitoring circuit 4, and the light bar driving circuit 5 share a same controller (i.e., the first controller 2). Moreover, respective pins of the touch control key output circuit 72, the light bar monitoring circuit 4 and the light bar driving circuit 5 are coupled to respective first interfaces in a first interface region 02 on the upper side of the second integrated driving board 004, and respective pins of the first controller 2 are coupled to respective second interfaces in the second interface region 03 on the lower side of the second integrated driving board 004. The display light bars 31 and the backup light bars 32 in the plurality of light bar groups 3 are coupled to the light bar monitoring circuit 4 and the respective light bar driving circuit 5 via corresponding first interfaces in the first interface region 02. The touch control key assembly 7 is coupled to the touch control key output circuit 72 via corresponding first interfaces in the first interface region 02. The glass module 1 is coupled to the first controller 2 via a corresponding second interfaces in a second interface region 03. The touch control key output circuit 72 receives a second touch control signal input by the touch control key assembly 7 and transmits the second touch control signal to the first controller 2. The first controller 2 may implement light adjusting control of the glass module 1, display control of the light bar group 3, touch control of the touch control key assembly, and the like according to the second touch control signal.

The second integrated driving board 004 is further provided with a second memory 01, and the second memory 01 may store the light transmittance of the glass module 1, the operating state information and the brightness information of the light bar groups 3, or the touch control information of the touch control key assembly 7. After the smart window is restarted, the first controller 2 may rapidly drive the glass module 1, the light bar group 3 and the touch control key assembly 7 according to the information of the light bar group 3 and information of the touch control key assembly 7 stored in the second memory 01.

Figure 8:
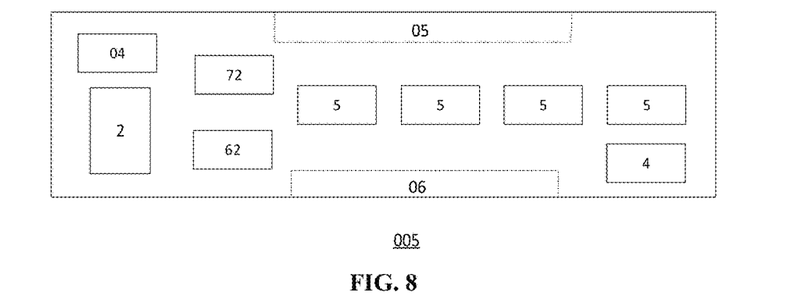
FIG. 8 is a schematic diagram illustrating a structure of a third integrated driving board in the embodiment of FIG. 7.

Further, referring to FIG. 7 and FIG. 8, in order to further reduce the wirings and reduce the space occupied by the circuits, the related circuits of the surface touch control assembly 6, the related circuits of the touch control key assembly 7 and the related circuits of the light bar group 3 may be integrated on one driving board. Specifically, the smart window may include a third integrated driving board 005 on which the light bar monitoring circuit 4, the light bar driving circuits 5, and the first controller 2 are integrated. Moreover, the surface touch control output circuit 62 and the touch control key output circuit 72 are also integrated on the second integrated driving board 005. The surface touch control output circuit 62, the touch control key output circuit 72, the light bar monitoring circuit 4 and the light bar driving circuit 5 share a same controller (i.e., the first controller 2). The respective pins of the surface touch control output circuit 62, the touch control key output circuit 72, the light bar monitoring circuit 4 and the light bar driving circuit 5 are coupled to the respective third interfaces in the third interface region 05 on the upper side of the third integrated driving board 005. The pins of the first controller 2 are coupled to respective fourth interfaces in the fourth interface region 06 on the lower side of the third integrated driving board 005. The display light bar 31 and the backup light bar 32 in each of the plurality of light bar groups 3 are coupled to the light bar monitoring circuit 4 and respective light bar driving circuit 5 via corresponding third interfaces in the third interface region 05. The surface touch control assembly 6 is coupled to the surface touch control driving circuit 62 via corresponding third interfaces in the third interface region 05. The touch control key assembly 7 is coupled to the touch control key output circuit 72 via corresponding first interfaces in the third interface region 05. The glass module 1 is coupled to the first controller 2 via corresponding fourth interfaces in the fourth interface region 06. The third integrated driving board 005 is further provided with a third memory 04, and the third memory 04 may store the light transmittance of the glass module 1, the operating state information and the brightness information of the light bar groups 3, or the touch control information of the surface touch control assembly 6, or the touch control information of the touch control key assembly 7, and the like. After the smart window is restarted, the glass module 1, the light bar group 3, the surface touch control assembly or the touch control key assembly and the like may be driven quickly by the information stored in the third memory 04.

Figure 9:
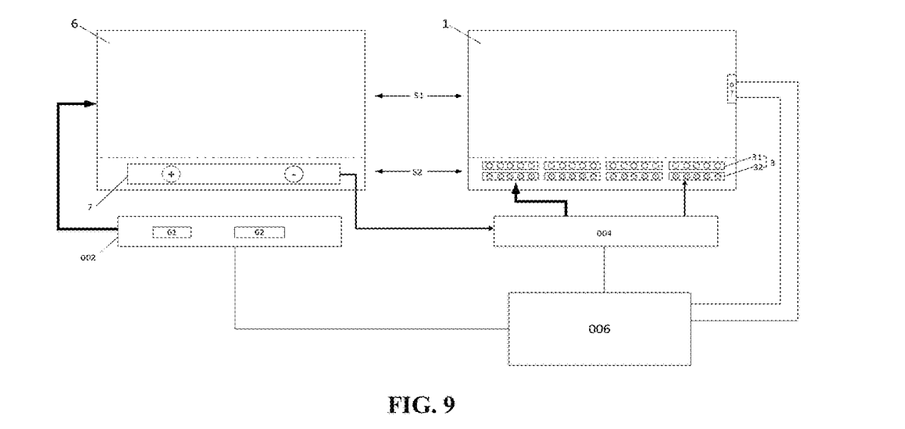
FIG. 9 is a schematic diagram illustrating a structure of a smart window (including a main control board) according to an embodiment of the present disclosure.
Figure 10:
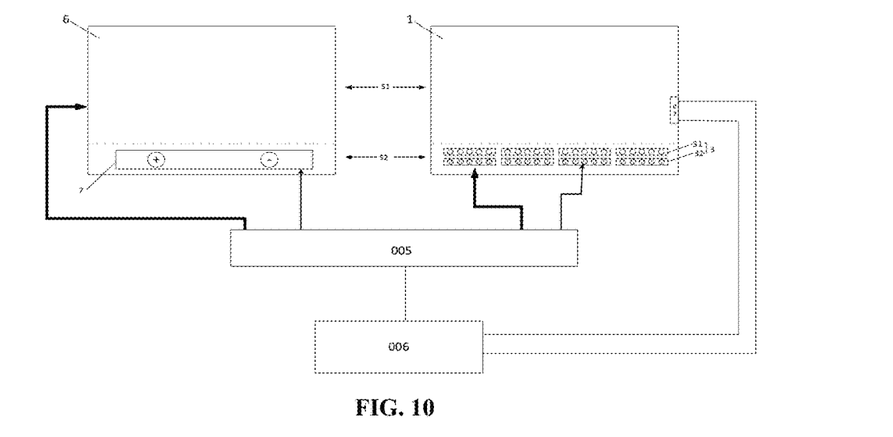
FIG. 10 is a schematic diagram illustrating a structure of a smart window (including a main control board) according to an embodiment of the present disclosure.

Optionally, as shown in FIG. 9 and FIG. 10, the smart window provided in the embodiment may further include a main control board 006 as a management center of the smart window. Before light adjusting of the glass module 1 or switching of the light bars in the light bar group 3, the light adjusting and the switching may be performed after confirmation by the main control board 006, so as to increase the stability of the system. The main control board 006 is coupled to the glass module 1, and directly applies voltages to the first electrode and the second electrode in the glass module 1 via a connector 07, so as to control the light transmittance of the glass module 1. Taking the example that the smart window includes the surface touch control driving board 002 and the second integrated driving board 004, the main control board 006 may be coupled to the surface touch control driving board 002 and the second integrated driving board 004, and may be coupled to the first controller 2 specifically via the second interface region 03 on the lower side of the second integrated driving board 004. If the surface touch control assembly 6 sends out the first touch control signal after being touched, the second controller 61 on the surface touch control driving board 002 feeds the first touch control signal back to the main control board 006 after receiving the first touch control signal. The main control board 006 sends a light adjusting instruction to the glass module 1 according to the first touch signal to adjust the light transmittance of the glass module 1. If the touch control key assembly 7 sends a second touch control signal after being touched, the first controller 2 on the second integrated driving board 004 firstly feeds the second touch control signal back to the main control board 006 after receiving the touch control signal. The main control board 006 sends a light adjusting instruction to the glass module 1 according to the second touch control signal so as to adjust the light transmittance of the glass module 1. The light bar monitoring circuit 4 on the second integrated driving board 004 monitors the light bar groups 3 and feed the operating states of the light bar groups 3 back to the first controller 2, and the first controller 2 feeds the operating states back to the main control board 006. If a certain light bar group 3 is abnormal, the main control board 006 returns a control instruction to the first controller 2 according to the operating state, and the first controller 2 sends out a corresponding instruction according to the control instruction to stop driving the abnormal display light bar 31 or the abnormal backup light bar 32 and to drive a new backup light bar 32. In addition, the main control board 006 may also be coupled to the surface touch control driving board 002 and the second integrated driving board 004 via a power line and a ground line to supply power for the surface touch control driving board 002 and the second integrated driving board 004. Optionally, the main control board 006 may also have a controller, which may parse the first touch control signal and the second touch control signal to obtain the corresponding operation instruction to adjust the glass module when the second controller 61 and the first controller 2 only provide the touch position information without parsing the operation instructions corresponding to the first touch control signal and the second touch control signal. Further, when the glass module is adjusted by the touch control instructions, the main control board may also send instructions to the light bar group based on the operation instructions to indicate the light transmittance and other information after the glass module is adjusted.

Similarly, taking the smart window including the third integrated driving board 005 as an example, the main control board 006 may be coupled to the third integrated driving board 005, and may be coupled to the first controller 2 specifically via the fourth interface region 06 on the lower side of the third integrated driving board 005. If the surface touch control assembly 6 sends the first touch control signal after being touched, the first controller 2 firstly feeds the first touch control signal back to the main control board 006 after receiving the first touch control signal, and the main control board 006 sends a light adjusting instruction to the glass module 1 according to the first touch control signal so as to adjust the light transmittance of the glass module 1. If the touch control key assembly 7 sends a second touch signal after being touched, the first controller 2 on the third integrated driving board 005 feeds the second touch signal back to the main control board 006 after receiving the second touch control signal, and the main control board 006 sends a light adjusting instruction to the glass module 1 according to the second touch control signal so as to adjust the light transmittance of the glass module 1. The light bar monitoring circuit 4 on the third integrated driving board 005 monitors the light bar groups 3 and feed the operating state of the light bar groups 3 back to the first controller 2, and the first controller 2 feeds the operating state back to the main control board 006. If a certain light bar group 3 is abnormal, the main control board 006 returns a control instruction to the first controller 2 according to the operating state, and the first controller 2 sends out a corresponding instruction according to the control instruction to stop driving the abnormal display light bar 31 or the abnormal backup light bar 32, and to drive a new backup light bar 32. In addition, the main control board 006 may also be coupled to the third integrated driving board 005 via a power line and a ground line to supply power to the third integrated driving board 005.

Optionally, based on the embodiment described in FIG. 9, the second integrated driving board 004 may be coupled to the plurality of light bar groups 3 via a flexible circuit board (FPC). The surface touch control driving board 002 may be coupled to the surface touch control assembly 6 via a FPC. Then, the second integrated driving board 004 and the surface touch control driving board 002 are bent to the edge of the smart window and placed on a side distal to the touch control surface of the smart window. The second integrated driving board 004 and the first touch control driving board 002 may be coupled to the main control board 006 via a communication interface RS485. Since the communication information amount between the second integrated driving board 004 and the main control board 006 is small, the second integrated driving board 004 may also be coupled to the main control board 006 via the communication interface RS232, which is not limited herein.

According to another aspect of the present disclosure, a smart window system is further provided. The smart window system includes at least one smart window as described above and a driving circuit for driving the smart window. The smart window may be applied to the smart window system of an automobile, a train, an airplane and the like, which is not limited herein.

Optionally, the smart window system may include a plurality of smart windows and a center console, and the center console may communicate with the main control board 006 in the plurality of smart windows, and thus the main control board 006 of the plurality of smart windows and the center console form a local region network to control the plurality of smart windows online.

Figure 11:
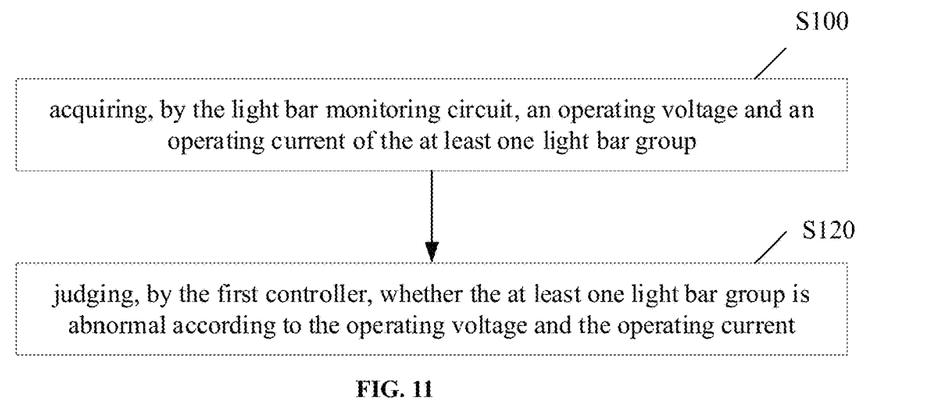
FIG. 11 is a flowchart of a method for driving a smart window according to an embodiment of the present disclosure.

According to another aspect of the present disclosure, a method for driving the smart window is provided. As shown in FIG. 11, the method includes the following steps S100 and S120.

In step S100, the operating voltage and the operating current of the at least one light bar group are obtained by the light bar monitoring circuit.

In step S120, whether the at least one light bar group is abnormal is determined by the first controller according to the operating voltage and the operating current.

Specifically, the first controller acquires the operating voltage and the operating current of the at least one light bar group via the light bar monitoring circuit to judge whether the currently displaying display light bar is abnormal. In the case where the currently displaying display light bar is judged to be abnormal, the first controller controls the corresponding light bar driving circuit to stop driving the display light bar and to drive one backup light bar in the at least one backup light bar.

Figure 12:
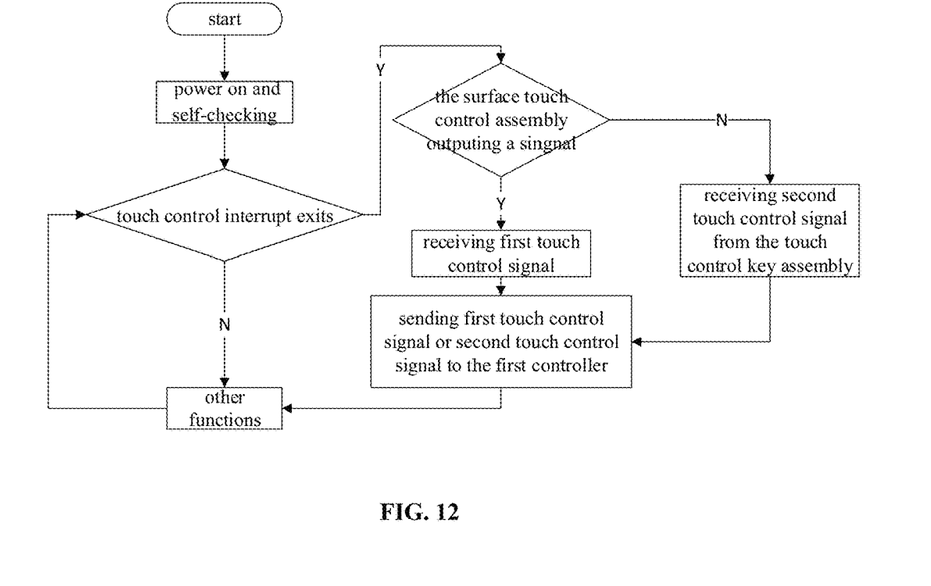
FIG. 12 is a flowchart illustrating how to perform light adjusting for a smart window according to an embodiment of the present disclosure.

Further, referring to FIG. 12, FIG. 12 is a flowchart illustrating how to perform light adjusting of a smart window by touch control according to an embodiment of the present disclosure. Firstly, self-checking of the smart window is performed after the smart window is powered on. The touch control light adjusting is started after the self-checking is completed. During the touch control light adjusting, whether a touch control interrupt signal exists is judged. If a touch control interrupt signal is received, whether the touch control interrupt signal is the first touch control signal output by the surface touch control output circuit is determined, and if so, the light adjusting of the glass module is performed based on the first touch control signal. If the touch control interrupt signal is the second touch control signal output by the touch control key output circuit, the light adjusting of the glass module is performed based on the second touch control signal. In addition, during the touch control light adjusting, whether the touch control failure of the surface touch control assembly 6 occurs is judged. If the touch control failure of the surface touch control assembly 6 occurs, whether the surface touch control assembly 6 outputs a signal is further detected. If the surface touch control assembly 6 outputs a signal, the first touch control signal is received and fed back to the first controller 2, and then the light adjusting is performed by combining other functions (such as a central control instruction existing in a local region network). If the surface touch control assembly 6 does not output a signal, the touch control key assembly 7 is used for light adjusting. The second touch control signal of the touch control key assembly 7 is received and fed back to the second controller 2, and then light adjusting is performed by combining other functions (such as a central control instruction existing in a local region network).

Figure 13:
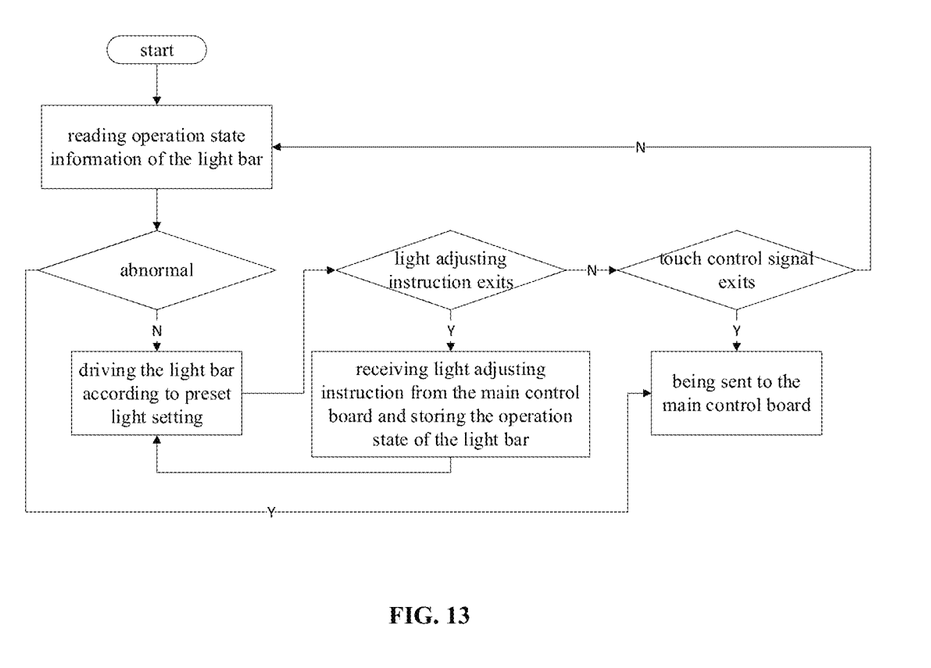
FIG. 13 is a flowchart illustrating how to perform light bar detection for a smart window according to an embodiment of the present disclosure.

Further, referring to FIG. 13, FIG. 13 is flowchart illustrating how to perform light bar detection in a smart window according to an embodiment of the present disclosure. Firstly, state information of the display light bars 31 and the backup light bars 32 (hereinafter, the display light bars 31 and the backup light bars 32 are collectively referred to as light bars) in the light bar groups 3, is read from a storage unit (for example, the second memory 02). The state information includes information on whether the light bars are activated, information on whether the light bars are deactivated, brightness information, and the like. Then, whether the light bar is abnormal is judged according to the state information. If the light bar is normal, the light bars are driven according to preset light bar setting (the brightness of the light bars currently started in the light bar groups 3). Whether a light adjusting instruction from the main control board 006 exists, if so, the operating state of the light bar is refreshed according to the light adjusting instruction and the operating state of the light bar is stored. If the light adjusting instruction does not exist, whether a touch control signal (the first touch control signal or a second touch control signal) exists is detected. If neither the touch control signal nor the light adjusting instruction exists, the light bar is refreshed according to the information in the storage unit for displaying. If the touch control signal exists, the touch control signal is sent to the main control board 006. The main control board 006 adjusts the light transmittance of the glass module 1 according to the touch control signal. If the light bar is abnormal, the abnormal information of the light bar is sent to the main control board 006, and the main control board 006 judges whether to instruct the first controller 2 to switch the light bar.

According to another aspect of the present disclosure, an apparatus for driving a smart window is further provided. The apparatus includes a processor and a memory. The memory stores program instructions. The processor executes the program instructions to execute the above driving method for a smart window.

According to another aspect of the present disclosure, a non-transitory computer storage medium having program instructions stored thereon is further provided. When the program instructions are executed on a computer, the computer executes the above driving method of a smart window.

It should be understood that the above embodiments are merely exemplary embodiments employed to illustrate the principles of the present disclosure, and the present disclosure is not limited thereto. It will be apparent to those skilled in the art that various changes and modifications can be made therein without departing from the scope of the disclosure as defined in the appending claims, and these changes and modifications are to be considered within the scope of the disclosure.

What is claimed is:

1. A smart window, comprising a glass module, a first controller, at least one light bar group and a light bar monitoring circuit; wherein
   the glass module is coupled to the first controller, and light transmittance of the glass module is controlled by the first controller;
   the at least one light bar group is coupled to the first controller and emits light under control of the first controller to indicate an operating state of the glass module; and
   the light bar monitoring circuit comprises at least one light bar monitoring sub-circuit; the at least one light bar monitoring sub-circuit is coupled to the first controller and is coupled in a one-to-one correspondence to the at least one light bar group, so as to detect the operating state of the light bar group coupled to the at least one light bar monitoring sub-circuit and feed the operating state back to the first controller;
   the smart window further comprises at least one light bar driving circuit which is coupled to the first controller and is coupled in a one-to-one correspondence to the at least one light bar group, wherein
   each of the at least one light bar group comprises a display light bar and at least one backup light bar, and both the display light bar and the at least one backup light bar in each of the at least one light bar group are coupled to a corresponding light bar driving circuit; and
   the first controller receives the operating state of the display light bar sent by the at least one light bar monitoring sub-circuit, and controls the corresponding light bar driving circuit to stop driving the display light bar and to drive one of the at least one backup light bar when the operating state of the display light bar is abnormal.

2. The smart window of claim 1, wherein each of the at least one light bar monitoring sub-circuit comprises:
   a sampling resistor, wherein a first end of the sampling resistor is coupled to a first end of the display light bar and a first end of the at least one backup light bar in a corresponding light bar group, and a second end of the sampling resistor is coupled to a reference power supply; and
   a plurality of state acquiring circuits, wherein the plurality of state acquiring circuits are coupled in a one-to-one correspondence to the display light bar and the at least one backup light bar in the corresponding light bar group, and the plurality of state acquiring circuits are coupled to the first end of the sampling resistor, a second end of the display light bar or a second end of the at least one backup light bar in the corresponding light bar group, and the first controller.

3. The smart window of claim 2, further comprising a memory coupled to the first controller, wherein the memory is configured to store voltages at the first and second ends of the display light bar acquired by the plurality of state acquiring circuits, a resistance value of the sampling resistor, and a current of the display light bar and voltages at the first and second ends of the display light bar during normal operation of the display light bar.

4. The smart window of claim 1, further comprising a light bar driving board on which the light bar monitoring circuit, the at least one light bar driving circuit and the first controller are integrated.

5. The smart window of claim 1, comprising a light adjusting region and a display region on at least one side of the light adjusting region, wherein the glass module is located in the light adjusting region and the at least one light bar group is located in the display region.

6. The smart window of claim 5, further comprising a touch panel coupled to the glass module and configured to adjust the light transmittance of the glass module by touch control.

7. The smart window of claim 6, wherein the touch panel comprises a surface touch control assembly and a surface touch control driving board, the surface touch control assembly is stacked with the glass module, the surface touch control driving board is coupled to the surface touch control assembly and the glass module, wherein
   the surface touch control driving board comprises a surface touch control output circuit and a second controller, the surface touch control output circuit receives a first touch control signal input by the surface touch control assembly and transmits the first touch control signal to the second controller, and the second controller adjusts the light transmittance of the glass module according to the first touch control signal.

8. The smart window of claim 7, wherein the touch panel further comprises a touch control key assembly and a touch control key driving board, the touch control key driving board is coupled to the touch control key assembly and the glass module, and the touch control key assembly is located in the display region of the smart window, wherein
   the touch control key driving board comprises a touch control key output circuit and a third controller, the touch control key output circuit receives a second touch control signal input by the touch control key assembly and transmits the second touch control signal to the third controller, and the third controller adjusts the light transmittance of the glass module according to the second touch control signal.

9. The smart window of claim 6, wherein the touch panel comprises a touch control key assembly and a touch control key driving board, the touch control key driving board is coupled to the touch control key assembly and the glass module, the touch control key assembly is located in the display region of the smart window, wherein
   the touch control key driving board comprises a touch control key output circuit and a third controller, the touch control key output circuit receives a second touch control signal input by the touch control key assembly and transmits the second touch control signal to the third controller, and the third controller adjusts the light transmittance of the glass module according to the second touch control signal.

10. The smart window of claim 6, wherein the touch panel further comprises a surface touch control assembly stacked with the glass module,
    the smart window further comprises a first integrated driving board on which the light bar monitoring circuit, the at least one light bar driving circuit and the first controller are integrated;

the first integrated driving board is further provided with a surface touch control output circuit, and the surface touch control output circuit is coupled to the surface touch control assembly and the first controller via a connecting structure on the first integrated driving board, and is configured to receive a first touch control signal input by the surface touch control assembly and to transmit the first touch control signal to the first controller; the first controller adjusts the light transmittance of the glass module according to the first touch control signal.

11. The smart window of claim 6, wherein the touch panel comprises a touch control key assembly in the display region of the smart window, the smart window further comprises a second integrated driving board on which the light bar monitoring circuit, the at least one light bar driving circuit and the first controller are integrated; and the second integrated driving board is further provided with a touch control key output circuit, the touch key output circuit is coupled to the touch control key assembly and the first controller via a connecting structure on the second integrated driving board, the touch control key output circuit receives a second touch control signal input by the touch control key assembly and transmits the second touch control signal to the first controller, and the first controller adjusts the light transmittance of the glass module according to the second touch control signal.

12. The smart window of claim 6, wherein the touch panel comprises a surface touch control assembly and a touch control key assembly, the surface touch control assembly is stacked with the glass module, and the touch control key assembly is located in the display region, the smart window further comprises a third integrated driving board on which the light bar monitoring circuit, the at least one light bar driving circuit and the first controller are integrated;

the third integrated driving board is further provided with a surface touch control output circuit and a touch control key output circuit; and the surface touch control output circuit is coupled to the surface touch control assembly and the first controller via a connecting structure on the third integrated driving board, and is configured to receive a first touch control signal input by the surface touch control assembly and to transmit the first touch control signal to the first controller; the touch control key output circuit is coupled to the touch control key assembly and the first controller via the connecting structure on the third integrated driving board, and is configured to receive a second touch control signal input by the touch control key assembly and to transmit the second touch control signal to the first controller; the first controller adjusts the light transmittance of the glass module according to the first touch control signal or the second touch control signal.

13. The smart window of claim 12, further comprising a main control board, wherein the main control board is coupled to the glass module and is coupled to the first controller via the connection structure on the third integrated driving board, and the main control board is configured to control display of the at least one light bar group according to the operating state of the at least one light bar group fed back by the first controller, and to generate voltages according to the first touch control signal or the second touch control signal fed back by the first controller to adjust the light transmittance of the glass module.

14. The smart window of claim 1, wherein each of the display light bar and the at least one backup light bar comprises a plurality of light emitting devices connected in series.

15. The smart window of claim 14, wherein the plurality of light emitting devices comprise sub-millimeter light emitting diodes.

16. A smart window system comprising the smart window of claim 1 and a driving circuit for driving the smart window.

17. A method for driving a smart window, the smart window comprising a glass module, a first controller, at least one light bar group and a light bar monitoring circuit; wherein the glass module is coupled to the first controller, and light transmittance of the glass module is controlled by the first controller;

the at least one light bar group is coupled to the first controller and emits light under control of the first controller to indicate an operating state of the glass module; and the light bar monitoring circuit comprises at least one light bar monitoring sub-circuit; the at least one light bar monitoring sub-circuit is coupled to the first controller and is coupled in a one-to-one correspondence to the at least one light bar group, so as to detect the operating state of the light bar group coupled to the at least one light bar monitoring sub-circuit and feed the operating state back to the first controller, the method comprising the following steps:

acquiring, by the light bar monitoring circuit, an operating voltage and an operating current of the at least one light bar group; and judging, by the light bar monitoring circuit, whether the at least one light bar group is abnormal according to the operating voltage and the operating current; and wherein the smart window further comprises at least one light bar driving circuit coupled to the first controller and coupled in a one-to-one correspondence to the at least one light bar group, and each of the at least one light bar group comprises a display light bar and at least one backup light bar, and both the display light bar and the at least one backup light bar in each of the at least one light bar group are coupled to a corresponding light bar driving circuit, the method further comprises the following steps:

in responsive to the first controller determining that the display light bar which displays is abnormal, controlling a corresponding light bar driving circuit to stop driving the display light bar and to drive one of the at least one backup light bar.

18. The method of claim 17, wherein the smart window further comprises a touch panel comprising a surface touch control assembly, a surface touch control output circuit coupled to the surface touch control assembly and the first controller, a touch control key assembly, and a touch control key output circuit coupled to the touch control key assembly and the first controller, and the method further comprises:

determining whether the first controller receives a touch control interrupt signal;

in responsive to the touch control interrupt signal being received, determining, by the first controller, whether the touch control interrupt signal is a first touch control signal which is generated by touching the surface touch control assembly and output by the surface touch control output circuit; and in responsive to the touch control interrupt signal being the first touch control signal output by the surface touch control output circuit, performing light adjusting of the glass module according to the first touch control signal; in responsive to the touch control interrupt signal being a second touch control signal which is generated by touching the touch control key assembly and output by the touch control key output circuit, performing the light adjusting of the glass module according to the second touch signal, and the method further comprises: in a case where the surface touch control output circuit does not output the first touch control signal when the surface touch control assembly is touched, prompting to perform the light adjusting of the glass module by the touch control key assembly.

\* \* \* \* \*